J. E. RICHARDSON.
MOTOR VEHICLE CONTROLLING MECHANISM.
APPLICATION FILED MAY 2, 1917.

1,255,228.

Patented Feb. 5, 1918.

Witness
G. F. Baker.

Inventor
John E. Richardson
By Foster Freeman Watson & Cort
Attorney

UNITED STATES PATENT OFFICE.

JOHN E. RICHARDSON, OF ELMIRA HEIGHTS, NEW YORK.

MOTOR-VEHICLE-CONTROLLING MECHANISM.

1,255,228.      Specification of Letters Patent.      Patented Feb. 5, 1918.

Application filed May 2, 1917. Serial No. 165,906.

*To all whom it may concern:*

Be it known that I, JOHN E. RICHARDSON, a citizen of the United States, and resident of Elmira Heights, Chemung county, State of New York, have invented certain new and useful Improvements in Motor-Vehicle-Controlling Mechanism, of which the following is a specification.

This invention relates to a motor vehicle controlling mechanism and more particularly to the foot pedals thereof.

Certain types of controlling mechanisms for motor vehicles include three substantially parallel foot pedals which have their foot tread surfaces substantially in a single plane. These pedals are arranged so close together that when the foot is placed on the central pedal and the latter actuated very often the foot also engages one of the side pedals and actuates the latter at the same time. It is an object of this invention to overcome this difficulty. To this end the invention resides in the provision of a central foot pedal having its foot tread surface located in advance or toward the operator with respect to the plane determined by the foot treads of the other two pedals, and this central foot tread is located in advance of the others an amount such that when the central foot tread is depressed it remains on the operator's side of the plane determined by the foot treads of the other two pedals. Other objects will be apparent from the description taken in connection with the drawings in which:—

Figure 1:
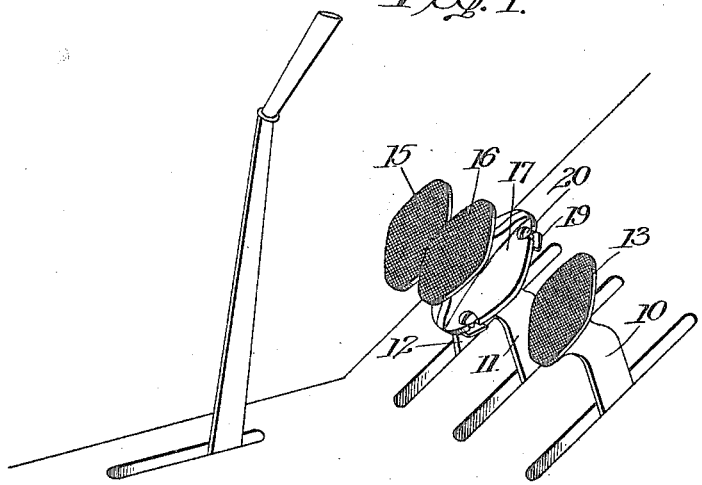
Figure 1 is a perspective view showing the arrangement of the pedals.
Figure 3:
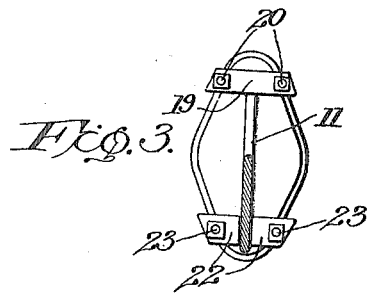
Fig. 3 is a section taken on the line 3—3 of Fig. 2 and showing the method of attaching the tread block to the central pedal.

As clearly shown in the drawings the controlling mechanism includes three parallel foot pedals 10, 11 and 12 having respectively foot treads 13, 14 and 15. As shown in Fig. 1 the parts are in the positions which they occupy when the vehicle is moving and it will be observed that the treads 13, 14 and 15 are very nearly in a single plane. It will also be observed that the pedals are arranged very closely one to another so that when the central pedal is operated it very often happens that the foot also engages the other tread 13 or 15 and thus actuates one of the side pedals.

Figure 2:
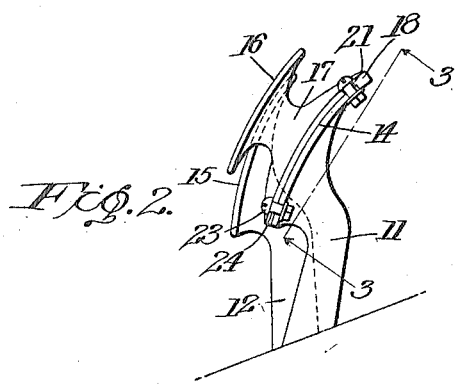
Fig. 2 is a side elevation of the central pedal showing that when it is in depressed position its foot tread surface is on the operator's side of the plane determined by the tread of the other pedals.

In order to overcome this difficulty the operative tread of the central pedal is arranged in advance of the plane determined by the treads 15 and 13 an amount such that when the central pedal is depressed as illustrated in Fig. 2 its operative tread surface 16 remains on the side toward the operator of the plane determined by the treads 15 and 13. Thus the foot in operating the central pedal does not strike the treads 13 or 15.

In order to provide means for readily converting mechanisms which have been built so as to embody my invention I provide a tread block 17 which is adapted to be removably secured to the central pedal tread. This tread block 17 is formed with a surface which is adapted to be fitted onto the surface of the tread 14 and at its upper end the block may be provided with a lip 18 which is adapted to take over the top edge of the said tread 14. The block is further secured to the tread by means of a cross bar 19 which extends crosswise and underneath the tread 14 and is adapted to coöperate with screws 20 which pass through slots 21 formed in the edge of the tread block to securely hold the block in contact with the tread. At its lower end the tread block is fastened to the foot pedal tread by two clips 22 which engage the undersurface of the tread portion 14 of the lever and coöperate with screws 23 which engage in slots 24 in the sides of the tread block.

As clearly shown in Fig. 2 the tread block is of such a height that when the central foot pedal 11 is depressed its tread surface 16 is on the operator's side of a plane determined by the tread surfaces 13 and 15.

It is apparent that other forms of tread blocks might be used and other means for attaching them to the foot pedals, the only requirement being that the tread block shall be of such height that when the pedal is depressed the tread surface of the tread block will be on the operator's side of the plane determined by the tread surfaces of the other pedals.

Having thus described the invention what is claimed and desired to be secured by Letters Patent is:

1. A motor vehicle controlling mechanism comprising three closely adjacent foot pedals arranged to move in parallel paths, the tread of the central pedal being arranged to project toward the operator from the plane determined by the treads of the other two pedals a sufficient amount so that when it is depressed it will not have moved to the other side of said plane.

2. In combination with a motor vehicle controlling mechanism comprising three closely adjacent foot pedals arranged to move in parallel paths, of a tread block detachably fastened to the central pedal, the height of the block being substantially equal to the movement of the pedal tread away from the operator.

In testimony whereof I affix my signature.

JOHN E. RICHARDSON.

Copies of this patent may be obtained for five cents each, by addressing the "Commissioner of Patents, Washington, D. C."